(12) United States Patent
Heelan, Jr. et al.

(10) Patent No.: US 7,578,496 B2
(45) Date of Patent: Aug. 25, 2009

(54) VALVE ARRANGEMENT

(75) Inventors: Raymond V. Heelan, Jr., Warren, PA (US); Gary M. Gustafson, Lakewood, NY (US)

(73) Assignee: Allegheny Valve and Coupling, Inc., Warren, PA (US)

( * ) Notice: Subject to any disclaimer, the term of this patent is extended or adjusted under 35 U.S.C. 154(b) by 280 days.

(21) Appl. No.: 11/653,767

(22) Filed: Jan. 16, 2007

(65) Prior Publication Data

US 2007/0194263 A1 Aug. 23, 2007

Related U.S. Application Data

(60) Provisional application No. 60/759,369, filed on Jan. 17, 2006.

(51) Int. Cl.
*F16K 31/50* (2006.01)
(52) U.S. Cl. .................. 251/265; 251/327; 251/329
(58) Field of Classification Search .............. 251/326, 251/327, 329, 265
See application file for complete search history.

(56) References Cited

U.S. PATENT DOCUMENTS

| | | | | |
|---|---|---|---|---|
| 111,373 | A * | 1/1871 | Murray, Jr. ................ | 251/265 |
| 154,271 | A * | 8/1874 | Regester ................... | 251/265 |
| 301,367 | A * | 7/1884 | Hoag, Sr. .................. | 251/265 |
| 467,369 | A | 1/1892 | Crighton | |
| 791,173 | A | 5/1905 | Anglim | |
| 1,149,848 | A * | 8/1915 | Marsh ....................... | 251/265 |
| 1,258,937 | A | 3/1918 | Palmer | |
| 1,273,445 | A * | 7/1918 | Beckerleg ................. | 251/265 |
| 1,328,098 | A * | 1/1920 | Palmer ...................... | 251/265 |
| 1,527,154 | A * | 2/1925 | Mallory et al. ........... | 251/265 |
| 1,898,147 | A * | 2/1933 | Smith ........................ | 251/265 |
| 2,388,989 | A | 11/1945 | Mueser | |
| 2,596,891 | A | 5/1952 | De Frees | |
| 2,930,571 | A * | 3/1960 | Vogl ......................... | 251/267 |
| 3,045,963 | A | 7/1962 | Hermann | |
| 3,326,512 | A * | 6/1967 | Clarke ....................... | 251/265 |
| 3,339,882 | A * | 9/1967 | Grove ....................... | 251/326 |
| 3,643,681 | A * | 2/1972 | Simmons ................... | 251/64 |
| 4,138,091 | A * | 2/1979 | McGee ..................... | 251/327 |
| 4,699,359 | A * | 10/1987 | David ........................ | 251/329 |
| 4,856,356 | A | 8/1989 | Gartner | |
| 5,784,922 | A * | 7/1998 | Ozaki et al. ............... | 74/89.37 |

* cited by examiner

Primary Examiner—John Bastianelli
(74) Attorney, Agent, or Firm—The Webb Law Firm, P.C.

(57) ABSTRACT

A valve arrangement includes a valve body defining an enclosure, having a bonnet connected to the valve body. A stem is rotatably attached to the valve body and positioned at least partially within the valve body. A handle is in operable communication with the stem and configured to rotate the stem. An actuation portion is positioned distal from the handle and in direct or indirect contact with the stem, wherein the actuation portion is configured to move when the stem is rotated. The stem includes a first thread portion and a second thread portion, the first thread portion having a first thread pitch and configured to interact with and move the actuation portion. The second thread portion is in communication with the bonnet having a second thread pitch and configured to move the stem with respect to the body. The second thread pitch is smaller than the first thread pitch.

19 Claims, 3 Drawing Sheets

VALVE ARRANGEMENT

CROSS REFERENCE TO RELATED APPLICATIONS

This application claims priority from U.S. Provisional Patent Application No. 60/759,369, filed Jan. 17, 2006, which is incorporated herein by reference in its entirety.

BACKGROUND OF THE INVENTION

1. Field of the Invention

The present invention relates generally to valves and valve arrangements for interacting with various components of a material transfer or handling system, such as a pipeline in a loading or unloading application and, in particular, to a threaded valve arrangement that allows for quick closure and improved sealing properties, including more powerful "seating" of the actuation portion of the valve while requiring less space than comparable valves.

2. Description of Related Art

Valves are used in a variety of applications and systems that require the prevention, redirection or manipulation of various product and material streams, whether solid, semi-solid or fluid materials. As is known in the art, these materials flow through the material handling system, such as in pipelines and the like, in order to transfer the materials from location to location. In order to manage the direction, flow and other characteristics of the material transfer process, valve arrangements are utilized. For example, such valve arrangements may include gate valves, manifold valves, butterfly valves, flapper valves, etc.

With respect to these valve arrangements, it is desirous to provide for the quick opening and closure of such a valve for a variety of reasons, including safety reasons. For example, in the instance of a pipeline failure in an upstream portion of the pipeline, a downstream valve such as, for example, a gate valve must be quickly closed to prevent any further fluid communication of the product from the downstream location to the upstream location. This is particularly important where the pipeline failure contains hazardous materials that could adversely affect the surrounding community and/or surrounding habitat.

In addition, not only is the speed of closure important, but the valve must be "seated" or sealed sufficiently using the actuation portion (e.g., the gate) to prevent all communication between the upstream and the downstream portions of the pipe. Therefore, not only must the person quickly close the valve in certain situations, but the valve must provide the optimum sealing characteristics in order to ensure that no material moves through the actuation portion when it is in the "closed" position.

Another safety consideration with respect to valve arrangements is the position of the handle and stem with respect to the walkway or passageway adjacent the handle. For example, and according to the prior art, most valve stems and handles project from the valve and pipe and extend into the walkway, which may pose a safety risk. In addition, many such piping systems include very narrow passageways, such that the projection or extension of the valve stem and handle into these passageways must be minimized as much as possible.

SUMMARY OF THE INVENTION

Accordingly, one object of the present invention is to provide a valve arrangement that overcomes the deficiencies and drawbacks of the prior art. It is another object of the present invention to provide a valve arrangement that allows for a faster opening and closing of the actuation portion of the valve. It is a further object of the present invention to provide a valve arrangement that allows for a more effective and powerful seating of the actuation portion when the valve is in a closed position. It is a still further object of the present invention to provide a valve arrangement that minimizes the projection of the stem and handle whether the valve is in the "open" or "closed" position.

Accordingly, the present invention is directed to a valve arrangement. The valve arrangement includes a valve body defining an enclosure and having a bonnet connected to the valve body. A stem is rotatably attached to the valve body and positioned at least partially within the valve body. Further, a handle is in operable communication with the stem and configured to rotate the stem. An actuation portion is positioned distal from the handle and in direct or indirect contact with the stem, wherein the actuation portion is configured to move when the stem is rotated. The stem includes a first thread portion and a second thread portion, the first thread portion having a first thread pitch and configured to interact with and move the actuation portion and the second thread portion is in communication with the bonnet having a second thread pitch and configured to move the stem with respect to the body. The second thread pitch is smaller than the first thread pitch.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
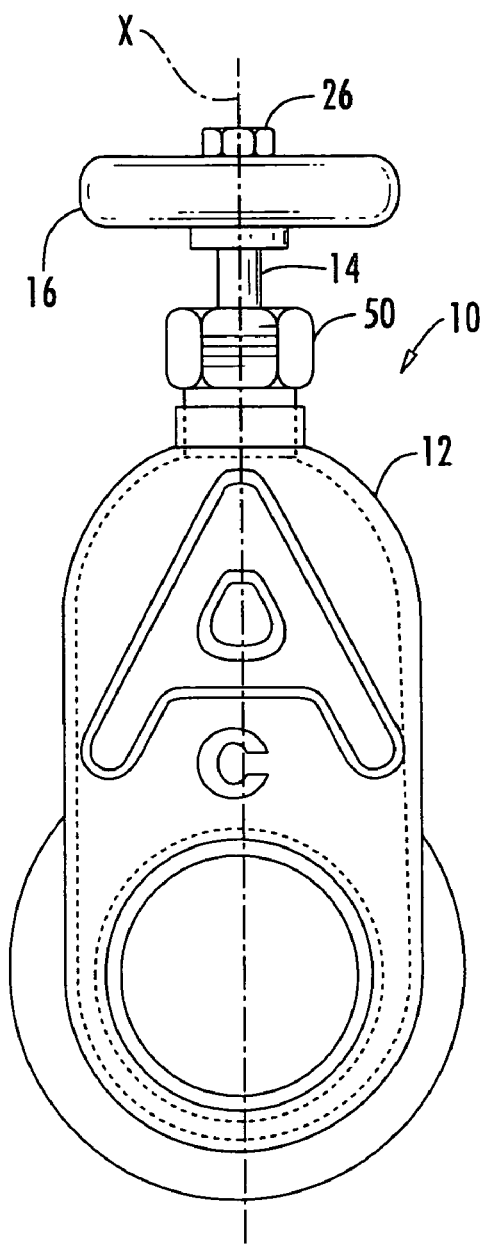
FIG. 1 is a front view of a valve arrangement according to the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 4:
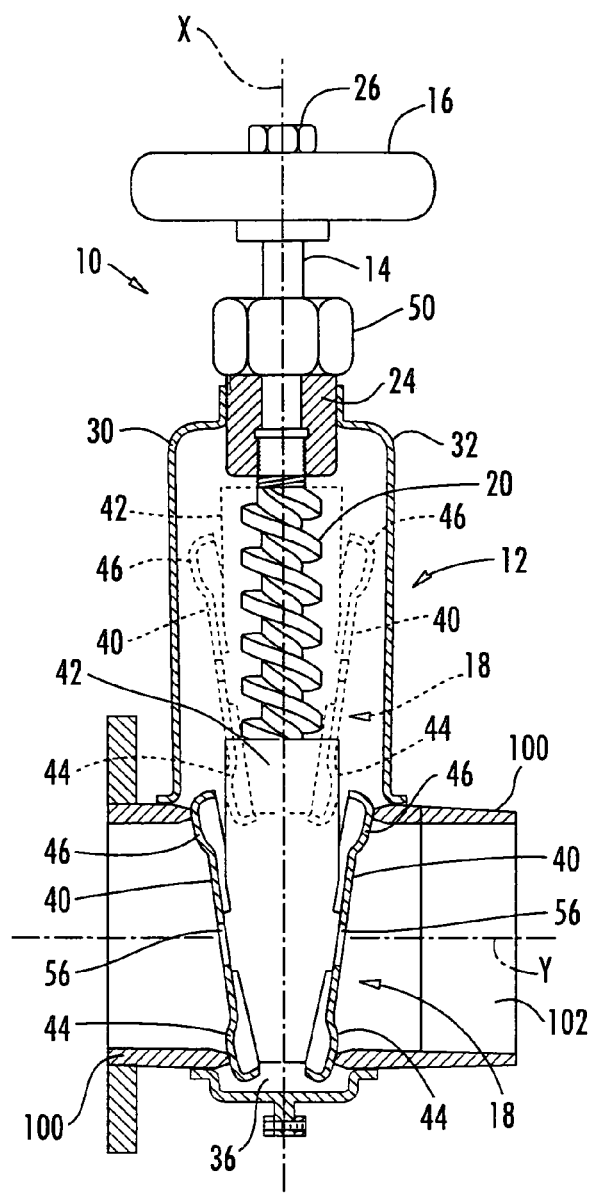
FIG. 4 is a side sectional view of a valve arrangement according to the present invention illustrating an actuation portion in a "closed" position and, in phantom, an "open" position.
Figure 5:
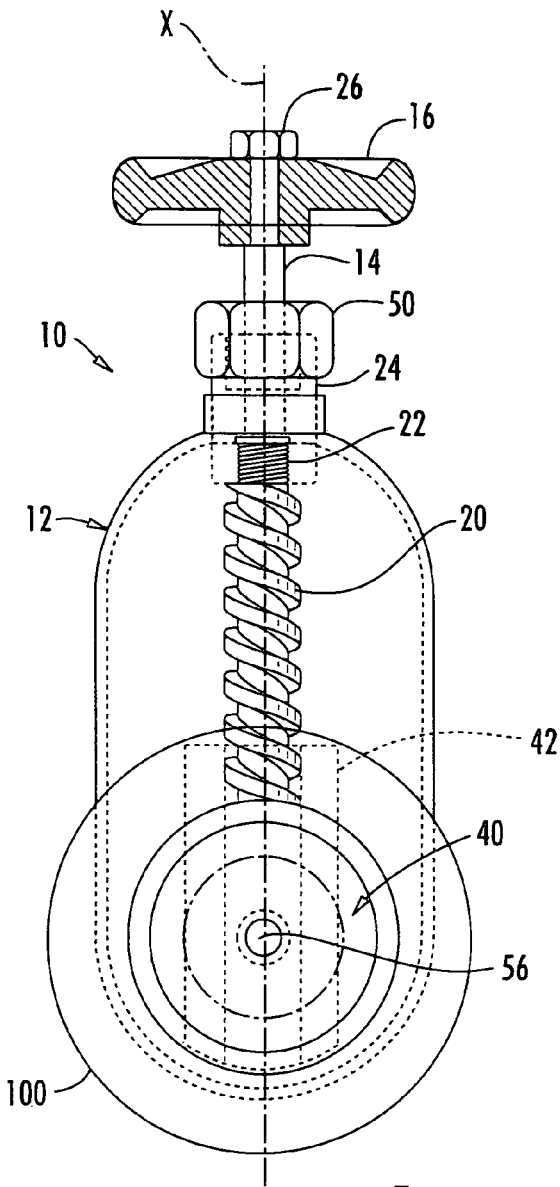
FIG. 5 is a sectional view of a valve arrangement according to the present invention.

The present invention is directed to a valve arrangement 10 as illustrated in various embodiments in FIGS. 1, 4 and 5. It should be noted that the embodiment illustrated herein includes components and subcomponents that are typical structural and operational components of a gate valve. However, the inventive concept described hereinafter can be used in connection with a variety of valve types, including gate valves, manifold valves, butterfly valves, flapper valves, check valves, safety valves, etc. Therefore, the use of the gate valve as one embodiment of the present invention is intended in no way as limiting to the use of this arrangement and operation in connection with other valve types.

In one preferred and non-limiting embodiment, the valve arrangement 10 includes a valve body 12. Valve body 12 may be formed from a variety of materials including, but not limited to, bronze, stainless steel, polymeric compounds, etc. Such materials may be dictated by the application for which the valve arrangement 10 will be employed. A stem 14 extends at least partially within the valve body 12 and may be rotatable within the valve body 12 about an axis X as shown in FIG. 1. A handle 16 may also be in operable communication with or attached to the stem 14. In operation, when the handle 16 is turned, the stem 14 rotates within the body 12 in correlation with the turning of the handle 16. Further, an actuation portion 18 may be in direct or indirect contact with the stem 14 and may travel therealong. Through this contact, the actuation portion 18 may be configured to move when the handle 16 is turned and the stem 14 rotated as described herein.

Figure 6:
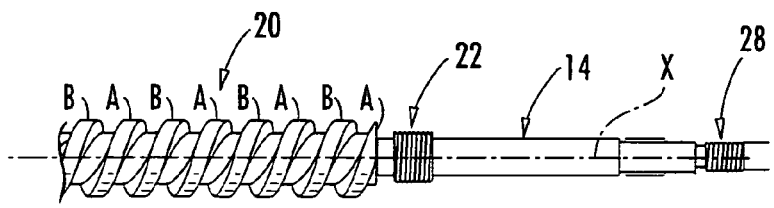
FIG. 6 is a side view of a stem of a valve arrangement according to the present invention.

As shown in FIGS. 4-6, the stem 14 includes a first thread portion 20 and a second thread portion 22. The first thread portion 20 includes a first thread pitch or rate, and further, the first thread portion 20 may interact with and move the actuation portion 18 between "open" and "closed" positions. The first thread portion 20 may be provided as large threads or other forms of threaded engagements with the actuation portion such as, for example, a barrel cam arrangement. Accordingly, the actuation portion 18 may travel along the axis X when the handle 16 is rotated, causing the first thread portion 20 to rotate as described herein.

The second thread portion 22 may be in communication with a bonnet 24, which is attached to the valve body 12, and may be in a substantially immovable relationship with the valve body 12. The second thread portion 22 also includes a second thread pitch or rate. As shown in FIGS. 4 and 5, the interaction between the second thread portion 22 and the bonnet 24 acts to linearly move the stem 14 with respect to the body 12 along the axis X. In addition, in various embodiments the pitch of the second thread portion 22 is smaller or "finer" than the first thread pitch of the first thread portion 20.

Referring now to FIG. 1, one preferred and non-limiting embodiment of the valve arrangement 10 is illustrated. As shown in this figure, the handle 16 may be attached to the stem 14 using an attachment nut 26 which may communicate with a third thread portion 28 of the stem 14 illustrated in FIG. 6. The attachment nut 26 may thus be coupled to and in communication with the third thread portion 28 rigidly, yet removably, to secure the handle 16 to the stem 14. Accordingly, when the handle 16 is rotated the stem 14 is correspondingly rotated within the valve body 12 to reposition the actuation portion 18.

Figure 2:
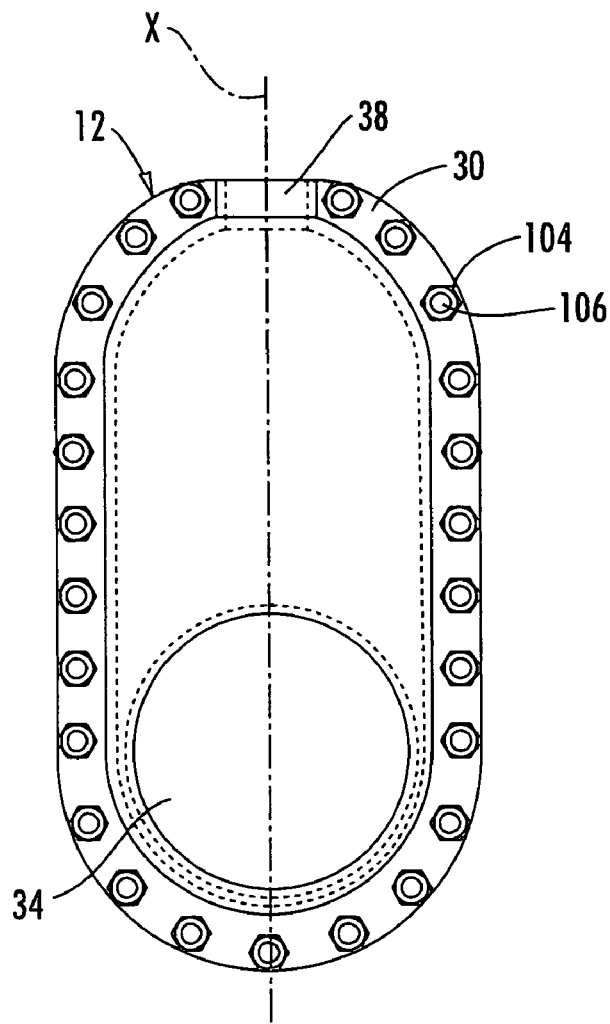
FIG. 2 is a front view of a valve body according to the present invention.
Figure 3:
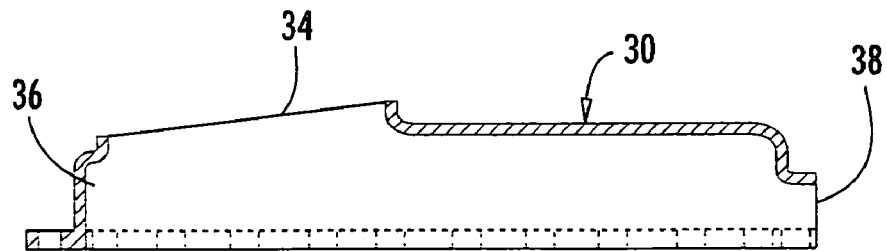
FIG. 3 is a side sectional view of the valve body of FIG. 2 taken along the X axis.

One embodiment of the valve body 12 is illustrated in FIGS. 2-4. As shown in FIG. 4, the valve body 12 includes a first body portion 30 and a second body portion 32 that may be similarly shaped to one another. Each body portion 30, 32 includes a pipe opening 34. Further, each body portion 30, 32 is configured to be positioned around or fitted with a respective pipe 100 that may lay along an axis Y. In addition, each body portion 30, 32 may be constructed such that they can be attached together such as by using a series of nuts 104 and bolts 106 or similar structural attachment mechanisms as is understood in the art. Regardless, the first and second body portions 30, 32 may be detachably engaged to create a sealed environment about the pipe 100.

When the first and second body portions 30, 32 are attached together, they may create a seating portion 36. The seating portion 36 may provide an area distal from the handle 16 and outside the area of the pipe 100 into which the actuation portion 18 may extend. As can be seen in FIG. 4, the actuation portion 18 generally extends into the seating portion 36 when in the "closed" position. In addition, when the first and second body portions 30, 32 are attached together, the body portions 30, 32 create a sleeve 38 proximal to the handle 16, within which the bonnet 24 may be positioned or attached.

FIGS. 4 and 5 illustrate the actuation portion 18 in the form of a gate. However, various closure mechanisms may be employed as discussed herein. For example, the actuation portion 18 of the valve arrangement according to the present invention may comprise a diaphragm valve, wedge (solid or flexible) valve, globe valve, pilot valve, piston valve, etc. Although the configuration of the sealing surface and valve arrangement structure may differ from the embodiment illustrated herein, as is known in the art for each type of valve, the present invention disclosed herein may be employed in each of these other valve arrangements.

In the illustrated embodiments of FIGS. 4, 5, 7 and 9-11, the actuation portion 18 includes two discs 40 that may be attached to a disc carrier block 42. In the present embodiment, the discs 40 and disc carrier block 42 form the actuation portion 18, which moves up and down with respect to the pipe 100 to place the valve arrangement 10 in the "open" or "closed" position. More specifically, the discs 40 move up and down with respect to an inner area 102 of the pipe 100, and extend at least partially into the seating portion 36 of the valve body 12 when in the "closed" position.

As best seen in FIG. 4, the discs 40 may be set at an angle to the axis X, such that the distance between bottom portions 44 of each disc 40 is less than the distance between top portions 46 of each disc 40. Further, as can be seen in FIGS. 4 and 5, the discs may completely obstruct the pipe 100 in the "closed" position. Accordingly, when the discs 40 are positioned in "closed" position, any materials within the pipe 100 will be obstructed from travel past the valve arrangement 10 and will thus form at least one seal.

In operation, the "angled" arrangement of the disks 40 allow for a better sealing force as the actuation portion 18 (i.e., discs 40 and disc carrier block 42) is moved from the "open" position into the "closed" or seated position. As the actuation portion 18 is repetitively opened and closed, the friction fit between the discs 40 and the respective portions of the pipe 100 becomes better and more conformal, thus providing a progressively improved seal. However, with respect to the prior art, this "seating" process is often difficult due to the angle and pitch of the first thread portion 20 and the lack of torque that can be applied as discussed further herein.

Turning now to the first thread portion 20 and second thread portion 22, and with reference to FIGS. 5 and 6, the first thread portion 20 includes a first thread pitch that is larger, coarser and more angled than the second thread pitch of the second thread portion 22. Accordingly, when the handle 16 (which rotates the stem 14) is rotated, the second thread portion 22 turns along with the first thread portion 20. The actuation portion 18 may thus travel up and down about the first thread portion 20 as shown in FIG. 4. In particular, through the interaction and communication between the disc carrier block 42 (as discussed further hereinafter) and the first thread portion 20, and due to the large pitch or angle of the first thread pitch in relation to the small pitch of the second thread pitch, the disc carrier block 42, and thus the discs 40, can be quickly translated between the "opened" and "closed" position.

Figure 7:
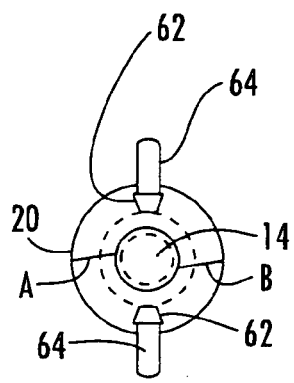
FIG. 7 is a top view of a first thread portion having rollers positioned therein according to the present invention.

In order to provide better coaction and easier and more efficient rotation, the first thread portion 20 of the stem 14 may be a "double-start" thread as shown in FIG. 6. Accordingly, the first thread portion 20 may have a first helix A and a second helix B having equal turn rates winding down the stem 14. These helixes A, B may be positioned 180 degrees with respect to each other on the same plane, as can be seen in FIG. 7, interweaving along the stem 14. Again, such an arrangement allows for eased travel and coaction between the disc carrier block 42 and the first thread portion 20. Further, the use of this "double-start" thread arrangement maximizes the speed of valve closure of the actuation portion 18 and improves the "power" of the final seating action with the ease of travel. It is also envisioned that single barrel cam, a "triple-start" or other similar thread arrangement could be used on the stem 14 as within the scope of the present invention.

Figure 8:
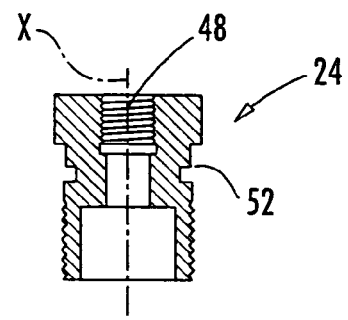
FIG. 8 is a sectional view of a bonnet of a valve arrangement according to the present invention.

With reference to FIGS. 5, 6 and 8, the second thread portion 22 is positioned above the first thread portion 20 on the stem 14, wherein the second thread portion 22 may interact and communicate with the bonnet 24. The bonnet 24 includes a thread train 48, as shown in FIG. 8, capable of interacting with the second thread portion 22 and second thread pitch. As the handle 16 is rotated and the stem 14 correspondingly rotated, the stem 14 moves in and out with respect to the valve body 12 due to the substantially rigid attachment of the bonnet 24 and the body 12. However, as best seen in FIG. 6 the second thread pitch of the second thread portion 22 is much finer, such that during the turning of the handle 16 the stem 14 moves only slightly in comparison to the movement of the actuation portion 18. This "slight" movement is due to the difference in pitch between the first and second pitches and allows for the rapid and effective closing of the actuation portion 18. Accordingly, a correspondingly large linear movement of the stem 14 and handle 16 in not required to rapidly and powerfully move the actuation portion 18 into the "closed" position. Thus, with a minimal number of turns of the handle 16, the valve arrangement 10 may be effectively and efficiently operated.

As seen in FIGS. 5 and 8, a stuffing box nut 50 is attached about the stem 14 and winds over and tightens the bonnet 24 with respect to the valve body 12 such that the valve arrangement 10 is appropriately sealed. In order to compliment this seal, it is also envisioned that the bonnet 24 may include an O-ring groove 52 for accepting an O-ring (not shown). By tightening the stuffing box nut 50, the bonnet 24 is further clamped within the valve body 12. In addition, it is envisioned that various O-rings or sealing arrangements can be obtained and used in order to clamp and seal the bonnet 24 and the stem 14 in accordance with the present invention. This seal prevents effective movement of fluid material up the stem 14 during the winding process, and prevents leakage in the system.

Figure 9:
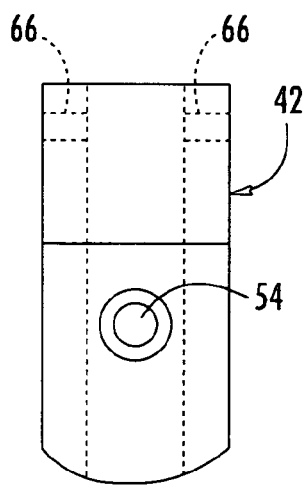
FIG. 9 is a front view of a disc carrier block of a valve arrangement according to the present invention.
Figure 10:
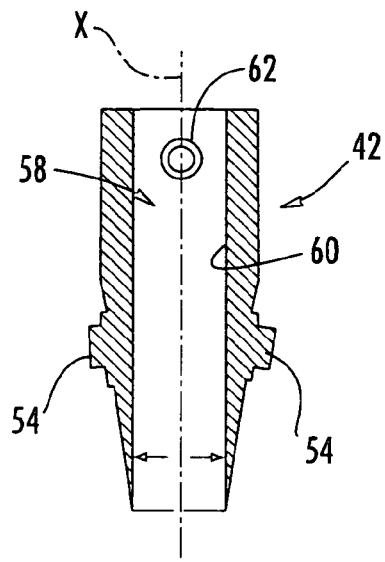
FIG. 10 is a side sectional view of the disc carrier block according to the present invention.
Figure 11:
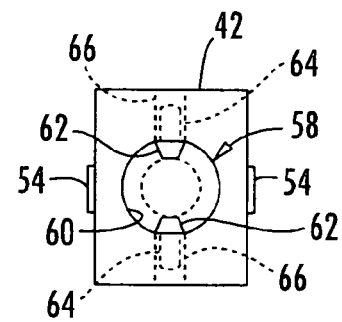
FIG. 11 is a top view of the disc carrier block of FIG. 10.

As discussed above, the discs 40 are attached to the disc carrier block 42. FIGS. 7 and 9-11 show various views of the portions of the disc carrier block 42 and first thread portion 20. In particular, the discs 40 can be attached to the disc carrier block 42 using a variety of attachment mechanisms and techniques as may be known in the art. In one embodiment, the disc carrier block 42 includes two opposing projections 54, as illustrated in FIGS. 10 and 11, which are configured to be at least partially inserted through corresponding orifices 56 (shown in FIG. 5) on each disc 40. Using a variety of techniques, such as welding or "button" welding, the discs 40 may be rigidly attached to the disc carrier block 42 using the projections 54 to attach the disc carrier block 42 to a corresponding orifice 56 of a disc 40.

The disc carrier block 42 also includes an inner shaft 58, as illustrated in FIGS. 10 and 11. Further, as can be seen in FIG. 9, projecting into the disc carrier block 42 from the inner shaft 58 are bores 66 which may extend partially or entirely through the disc carrier block 42. As can be seen in FIGS. 4 and 5, the first thread portion 20 may be inserted into the inner shaft 58. Projecting into the inner shaft 58 from the bores 66 beyond a shaft wall 60, are two rollers 62. These rollers 62 may be rotatably connected to the shaft wall 60 in various manners in accordance with the present invention, and further are configured to interact with the first thread portion 20 of the stem 14. In the illustrated embodiment, the rollers 62 may be mounted on axles 64, each axle 64 being positioned within the bore 66 of the disc carrier block 42 and extending into the inner shaft 58 away from the shaft wall 60. Alternatively, the axles 64 may be integrally formed into the disc carrier block 42. Still further, the axle 64 may be fixedly mounted within the bore 66 and extend into the inner shaft 58 away from the shaft wall 60. Accordingly, as can be seen in FIG. 7, the disc carrier block 42 may have opposing rollers 62 wherein each roller 62 may be positioned on a separate helix A, B.

As the handle 16 is turned and the stem 14 rotated, the first thread portion 20 rotates and the disc carrier block 42 moves up and down through the coaction between the rollers 62 and the first thread portion 20. It is envisioned that the rollers 62 are sized, shaped and operable to maximize contact within the first thread portion 20 such that unnecessary movement or "jumping" between individual helixes A, B is prevented. In addition, it is also envisioned that any suitable structural arrangement could be used in connection with the actuation portion 18 for coaction with the first thread portion 20. For example, a mating thread train could alternatively be positioned or disposed on the shaft wall 60 of the inner shaft 58 in place of the rollers 62 in accordance with the present invention.

In operation, when the handle 16 is turned and the stem 14 rotated, the disc carrier block 42 and attached discs 40 move quickly between the "open" position and "closed" position due to the first thread pitch. Simultaneously, the stem 14 moves only slightly due to the much finer second thread pitch of the second thread portion 22, which also serves to finally drive the discs 40 into the seating portion 36. This movement provides for a powerful sealing action at the end of the rapid motion provided by the disc carrier block 42 and rollers 62

(together with the first thread portion 20). Such a final "seating" would not be possible with only the first thread portion 20 due to the first thread pitch and difficulty associated with additional movement of the handle 16. Alternatively, such efficiency of closure of the valve arrangement 10 would not be possible with only the second thread portion 22 due to the small second thread pitch.

The number of turns of the handle 16 required to move from an "open" position to a "closed" position may be infinitely adjustable by adjusting the rate or pitch of the first thread portion 20 in relation to the second thread portion 22. For example, in one embodiment, the actuation portion 18 can go from a full "open" position to a completely "closed" position in three turns of the handle 16, or in another embodiment in 2½ turns of the handle 16. However, as discussed above, the number of turns of the handle 16 can be adjusted according to a specific circumstance and application.

In one example, when the handle 16 is turned about three times, which moves the actuation portion 18 from a "closed" position to an "open" position, the second thread portion 22, which includes a second thread pitch of 0.0625 inches, enables the stem 14 to move only approximately 0.19 inches. During this same movement, the actuation portion 18, i.e., the disc carrier block 42 and attached discs 40, move about 3.38 inches. Accordingly, such an arrangement demonstrates that the stem 14 movement and the actuation portion 18 movement are quite different, even while both movements are facilitated by turns of the same handle 16 and rotation of the same stem 14.

In this manner, the valve arrangement 10 uses the first thread portion 20 and second thread portion 22 to provide a quick-closing valve. Further, the present invention provides a valve arrangement 10 that effectively and forcefully "seats" the actuation portion 18 in the pipe inner area 102. During and after operation, the handle 16 and stem 14 project from the valve body 12 in an obtrusive position. However, the projection of the handle 16 from the valve body 12 is minimized due to the small thread pitch of the second thread portion 22. Such an arrangement also minimizes the possibility of foreign material being drawn into the seal area as the valve is moved into the "closed" position. Still further, the present invention provides a valve arrangement 10 that is more compact and minimizes the possibility of stem 14 damage from inadvertent contact causing bending, injuries, etc.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A valve arrangement, comprising:
a valve body defining an enclosure and having a bonnet connected thereto;
a stem rotatably attached to the valve body and positioned at least partially within the valve body;
a handle in operable communication with the stem and configured to rotate the stem; and
an actuation portion including at least one roller and positioned distal from the handle and in direct or indirect contact with the stem, wherein the actuation portion is configured to move when the stem is rotated,
wherein the stem includes a first thread portion and a second thread portion, the first thread portion having a first thread pitch and configured to interact with and move the actuation portion, and the second thread portion in communication with the bonnet and having a second thread pitch and configured to move the stem with respect to the body;
wherein the second thread pitch is smaller than the first thread pitch;
wherein the first thread portion is in the form of a barrel cam and defines a path in which the at least one roller is at least partially captured and along which the at least one roller travels when the stem is rotated, thereby moving the actuation portion between open and closed positions; and
wherein the actuation portion is urged into a final, seated position when the stem is rotated through linear movement of the stem and actuation portion based upon the interaction between the second thread portion and the bonnet.

2. The valve arrangement of claim 1, wherein the actuation portion further comprises a disc carrier block in communication with the first thread portion and at least one disc attached to the disc carrier block.

3. The valve arrangement of claim 2, wherein the disc carrier block defines an inner shaft configured to secure the at least one said roller.

4. The valve arrangement of claim 1, wherein the second thread portion is positioned between the first thread portion and the handle.

5. The valve arrangement of claim 1, wherein the first thread portion comprises at least two thread helixes.

6. The valve arrangement of claim 1, wherein the stem further comprises a third thread portion thereon configured to receive an attachment nut coupled to the handle.

7. The valve arrangement of claim 1, wherein the actuation portion is further configured to obstruct materials from passing through at least a portion of the piping system.

8. The valve arrangement of claim 7, wherein the actuation portion further comprises a gate configured to obstruct materials from passing through at least a portion of the piping system.

9. The valve arrangement of claim 8, wherein the gate further comprises a disc carrier block and at least one disc attached to said disc carrier block.

10. The valve arrangement of claim 9, wherein the disc carrier block defines an inner shaft having at least one bore extending into the disc carrier block from the inner shaft.

11. The valve arrangement of claim 10, wherein the at least one roller is positioned within the bore and extends into the inner shaft for communicating with the first thread portion.

12. The valve arrangement of claim 10, wherein the shaft defines an axis and wherein the at least one disc is attached to said disc carrier block at an angle away from said axis.

13. A gate valve arrangement, comprising:
a valve body defining an enclosure having a sleeve opening and a pipe opening;
a bonnet sealingly positioned within the sleeve opening;
a stem rotatably engaging the bonnet within the enclosure and extending along an axis at least partially outside of the enclosure;
a handle secured to the stem outside of the enclosure and configured to rotate the stem; and
a gate configured to travel along the axis about the stem, the gate comprising:
a disc carrier block including at least one roller and in communication with the stem within the enclosure distal from the handle, wherein the disc carrier block is configured to travel between a closed position adjacent the pipe opening and an open position adjacent the bonnet; and at least one disc secured to the disc carrier block distal from the handle, wherein the stem includes a first thread portion having a first thread pitch and a second thread portion having a second thread pitch, the first thread portion configured to communicate with and move the gate when the handle is rotated, and the second thread portion in communication with the bonnet and configured to move the stem with respect to the body along the axis when the handle is rotated, and wherein the second thread pitch is smaller than the first thread pitch;

wherein the first thread portion is in the form of a barrel cam and defines a path in which the at least one roller is at least partially captured and along which the at least one roller travels when the stem is rotated, thereby moving the gate between the open and closed positions; and wherein the gate is urged into a final, seated position when the stem is rotated through linear movement of the stem and gate based upon the interaction between the second thread portion and the bonnet.

14. The gate valve arrangement of claim 13, wherein the gate is further configured to obstruct materials from passing through at least a portion of the piping system.

15. The gate valve arrangement of claim 13, wherein the disc carrier block defines an inner shaft having at least one bore extending into the disc carrier block from the inner shaft.

16. The gate valve arrangement of claim 15, wherein the at least one roller is positioned within the bore and extends into the inner shaft for communicating with the first thread portion.

17. The gate valve arrangement of claim 16, wherein the shaft defines an axis and wherein the at least one disc is attached to said disc carrier block at an angle away from said axis.

18. The gate valve arrangement of claim 13, further comprising two opposing discs secured to the disc carrier block.

19. The gate valve arrangement of claim 13, wherein the stem defines an axis and wherein each disc is attached to said disc carrier block at an angle away from said axis.

* * * * *